United States Patent [19]

Thiele

[11] Patent Number: 4,583,885

[45] Date of Patent: Apr. 22, 1986

[54] VACUUM RECEIVER

[75] Inventor: Charles W. Thiele, Kalamazoo, Mich.

[73] Assignee: Kenntnis, Inc., Kalamazoo, Mich.

[21] Appl. No.: 641,133

[22] Filed: Aug. 15, 1984

[51] Int. Cl.$^4$ .............................................. B65G 53/60
[52] U.S. Cl. ...................... 406/168; 55/434; 55/418
[58] Field of Search ............... 406/168, 167, 116, 156; 414/291; 55/434, 319, 410, 418, 441, 464; 175/206, 212, 213; 141/7, 65

[56] References Cited

U.S. PATENT DOCUMENTS

| | | | |
|---|---|---|---|
| 1,271,834 | 7/1918 | Baum et al. | 406/167 X |
| 2,074,818 | 3/1937 | Watson | 55/458 |
| 2,087,464 | 7/1937 | Ayers | 406/168 X |
| 4,223,748 | 9/1980 | Barendsen | 55/434 X |

Primary Examiner—Jeffrey V. Nase
Assistant Examiner—L. E. Williams
Attorney, Agent, or Firm—Flynn, Thiel, Boutell & Tanis

[57] ABSTRACT

A vacuum receiver having a first elongate tube oriented along a vertical axis with a second tube of sufficiently greater girth encircling the first tube and forming an annular passage therebetween. A first conduit extends through the side wall of the first and second tubes and opens outwardly inside the first tube. The first tube has a top wall closing off the upper end and an open lower end. A second conduit extends coaxial with the first tube and is smaller in diameter than the first tube and terminates above the top wall. The second conduit communicates with the second tube leading a fluid stream from the passage at a location directly above the top wall. Adjustment structure is provided for varying the effective vertical spacing between the terminal end of the second conduit and the top wall of the first tube to thereby enable a varying of the velocity of the fluid stream in the passage to accommodate a specified material without causing the material to exit the second tube via the second conduit. Other features of the invention include additional adjustment structure for altering the effective vertical length of the aforesaid passage.

6 Claims, 4 Drawing Figures

VACUUM RECEIVER

FIELD OF THE INVENTION

This invention relates to a vacuum receiver that separates dry, powdered and granular products from an incoming airstream without the use of internal filters. More particularly, this invention relates to a vacuum receiver in a pneumatic conveying system of the type wherein dry, powdered and granular products are conveyed by an airstream from a place of storage to machine or like destination in a processing line where the product is to be used.

BACKGROUND OF THE INVENTION

In the known pneumatic blower conveying systems, such as is described in U.S. Pat. Nos. 2,688,517 and 2,688,518, difficulty is encountered with periodic clogging of the filters which must be employed to dissipate the airstream once it has been returned to the storage bin, because the separation of the flour from the conveying airstream has not heretofore been as effective as is desirable. Such systems must be shut down at regular intervals so that the filters can be removed, cleaned, and replaced or in some installations so that filters can be subjected to reverse air cleaning action. Further, the provision of such filters in effect opens the storage bin to dust and possible infestation by insects.

U.S. Pat. No. 3,030,153 represents an improvement over the aforementioned known devices in that the device enables a pneumatic conveying of product from one location to another without the use of filters. This system, however, is not entirely satisfactory due to the inability of the system to accommodate materials of differing granular sizes. In other words, a different vacuum receiver device would need to be utilized in situations where product having different granular sizes was utilized in order to prevent the flow of product through the exhaust line toward the exhaust blower. Accordingly, a need has arisen for enabling a single vacuum receiver to be utilized in the handling of a multitude of different dry, powdered and granular products.

Accordingly, it is an object of this invention to provide a vacuum receiver in which there are no filters in the fluid circuit for the purpose of releasing the product from the airstream as the airstream is exhausted from the system via an exhaust blower.

It is a further object of this invention to provide a vacuum receiver, as aforesaid, which has the ability to accommodate differing materials under wholly separate operating conditions and without necessitating a replacement of any of the components in the system.

It is a further object of the invention to provide a vacuum receiver, as aforesaid, wherein the adjustment required to accommodate product of different granular size can be made easily and with a minimum of difficulty.

It is a further object of this invention to provide a vacuum receiver, as aforesaid, wherein the vacuum receiver is adapted to be mounted on existing hopper constructions in the field.

SUMMARY OF THE INVENTION

In general, the objects and purposes of the invention are met by providing, in a fluid conveying system for use on a collecting structure for collecting material removed from a fluid stream, a vacuum receiver having a first elongate tube oriented along a vertical axis with a second tube of sufficiently greater girth encircling the first tube and forming an annular passage therebetween. A first conduit extends through the side wall of the first and second tubes and opens outwardly inside the first tube. The first tube has a top wall located above the location whereat the first conduit extends into the first tube and an opening beneath the location whereat the first conduit extends into the first tube. A second conduit extends coaxial with the first tube and is smaller in diameter than the first tube and terminates above the top wall. The second conduit communicates with the second tube leading the aforesaid stream from the passage at a location directly above the top wall and causing the direction of axial travel of the stream in the passage to be changed through two opposite 90° turns. Adjustment structure is provided for varying the effective vertical spacing between the terminal end of the second conduit and the top wall of the first tube to thereby enable a varying of the velocity of the fluid stream in the passage to accommodate a specified material without causing the material to exit the second tube via the second conduit. Other features of the invention include additional adjustment structure for altering the effective vertical length of the aforesaid passage.

BRIEF DESCRIPTION OF THE DRAWINGS

Further objects and purposes of this invention will be apparent to persons acquainted with apparatus of this general type upon reading the following specification and inspecting the accompanying drawings, in which.

DETAILED DESCRIPTION

Figure 1:
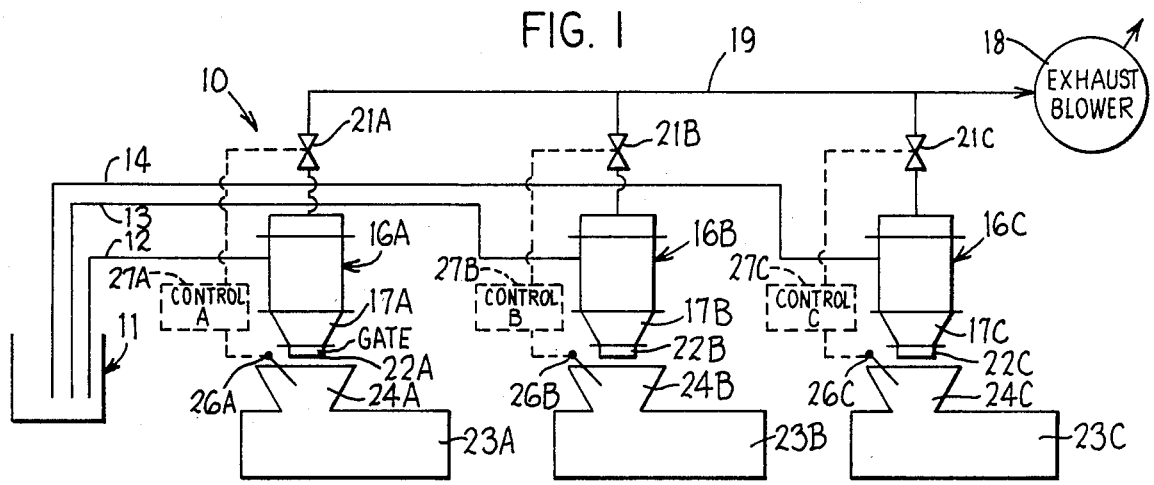
FIG. 1 is a schematic of a pneumatic conveying system for use in conveying particulate material entrained in a stream to a processing machine or plural processing machines or the like in a processing line wherein the particulate material is to be used.

Certain terminology may be used in the following description for convenience in reference only and will not be limiting. The words "up" and "down" will designate directions in the drawings to which reference is made. The words "upstream" and "downstream" will refer to the direction of material flow through the device, "upstream" to "downstream" being the normal flow direction. The words "in" and "out" will refer to directions toward and away from, respectively, the geometric center of the device and designated parts thereof. Such terminology will include the words above specifically mentioned, derivatives thereof and words of similar import.

While the following discussion refers to the use of the device in conjunction with an extruder, it is to be understood that its application is broad based and can be applied for the filling of a variety of extruders, injection molding machines, storage silos, mixers, and virtually any other receiving vessel or device to which the dry, particulate material would have to be conveyed.

FIG. 1 illustrates a pneumatic conveying system 10 particularly adapted to convey a particulate material from a material source 11 through various conduits 12, 13 and 14 each to a vacuum receiver 16A, 16B and 16C embodying the invention. The particulate material entrained in the fluid, generally air, in the conduits 12, 13 and 14 is extracted from the fluid and collected in hoppers 17A, 17B and 17C oriented immediately below the respective vacuum receiver 16A, 16B and 16C. An exhaust blower 18 is provided and is connected to each of the vacuum receivers 16A, 16B and 16C through an exhaust conduit 19 and valves 21A, 21B and 21C, the valve 21A being intermediate the exhaust blower 18 and the vacuum receiver 16A, the valve 21B being intermediate the exhaust blower 18 and the vacuum receiver 16B and the valve 21C being oriented between the exhaust blower 18 and the vacuum receiver 16C.

At the bottom end of each of the hoppers 17A, 17B and 17C there is provided a gate 22A, 22B and 22C, respectively. Beneath each of the gates 22A, 22B and 22C there is provided an extruder 23A, 23B and 23C, respectively, each having a hopper 24A, 24B and 24C thereon. A level sensor 26A is provided in the hopper 24A to detect the level of particular material therein. Similarly, level sensors 26B and 26C are provided in the hoppers 24B and 24C, respectively. Conventional control circuitry 27A is provided and is responsive to the level sensor 26A detecting the level of fullness or emptyness of the hopper 24A. For example, and upon the level sensor 26A detecting an emptyness in the hopper 24A, the control circuitry 27A will open the valve 21A thereby causing the exhaust blower 18 to draw a negative pressure in the vacuum receiver 16A. Identical control circuitry 27B and 27C is connected in association with the level sensor 26B and valve 21B as well as the level sensor 26C and valve 21C. The effect of a negative pressure being drawn on the vacuum receivers 16A, 16B and 16C will be explained in further detail hereinbelow.

For purposes of the following discussion, and since each of the vacuum receivers 16A, 16B and 16C as well as the hoppers 17A, 17B and 17C are all identical, only the vacuum receiver 16A and hopper 17A will be described in more detail hereinbelow. It is to be understood that the further reference numerals used in association with the vacuum receiver 16A and the associated hopper 17A will not have the suffix "A" and further that these reference numerals will be applicable to the remaining vacuum receivers 16B and 16C mentioned above.

The hopper 17A has an upper cylindrical segment 28, the longitudinal axis of which is oriented vertically. The vacuum receiver 16A includes an outer cylindrical shell or tube 29 which is mounted on the upper end of the cylindrical segment 28 and forms an extension thereof. The structure by which the tube 29 is connected to the cylindrical segment 28 can be of any conventional variety as by welding or by the provision of appropriate mounting flanges.

Figure 3:
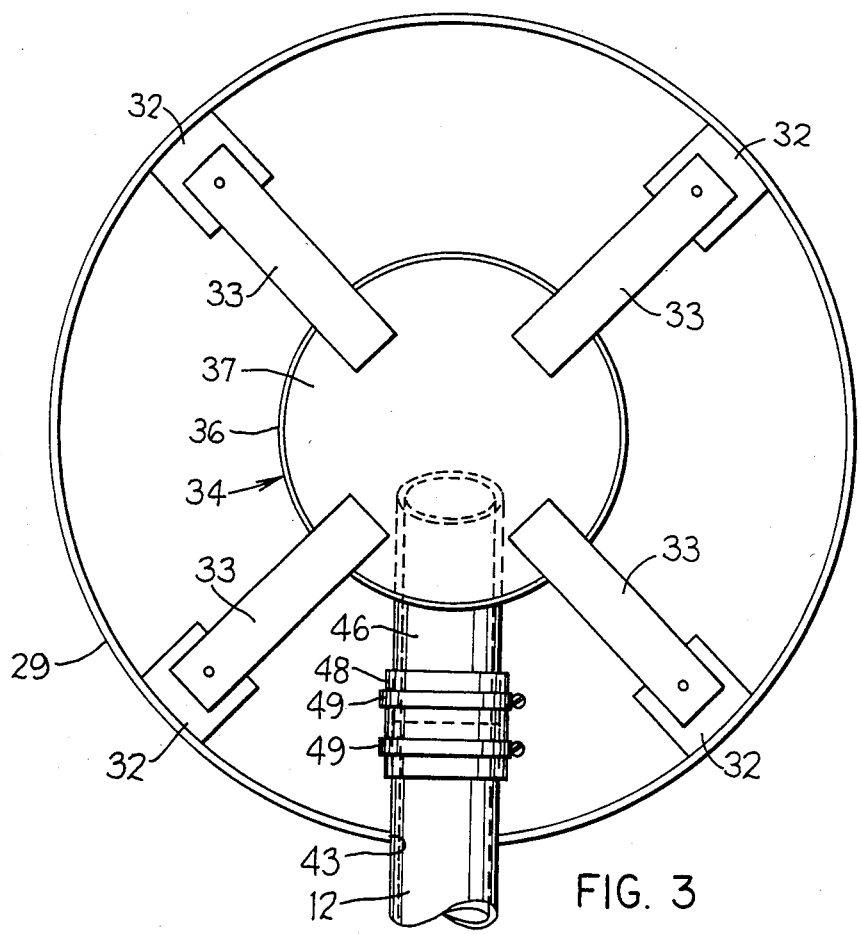
FIG. 3 is a sectional view taken along the line III—III of FIG. 2.
Figure 4:
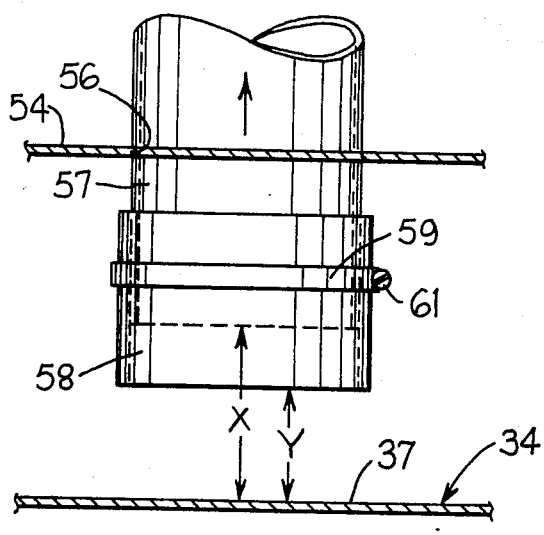
FIG. 4 is an enlarged fragment illustrating the effective spacing between the terminal end of the exhaust conduit and the top wall of the inner deceleration cylinder.

A radially outwardly extending flange 31 is provided on the upper edge of the tube 29. In addition, a plurality of inwardly extending tabs 32 are mounted adjacent the upper edge of the tube 29 and extend radially inwardly at 90° spacings from each other as illustrated in FIG. 3. Each tab 32 has fixedly secured thereto a radially inwardly extending support bar 33, each support bar 33 being cantilevered from a respective tab 32.

A deceleration cylinder 34 is secured to the inner ends of each of the support bars 33. More specifically, the deceleration cylinder 34 includes a cylindrical shell or tube 36 oriented concentrically with the shell or tube 29 on the interior thereof. The shell or tube 36 has a top wall 37 closing off the upper end thereof. The lower end of the tube 36 is open. The length of the tube 36 is such that the lower end terminates, in this particular embodiment, just above the dividing line between the cylindrical segment 28 of the hopper 17A and the tube 29. If desired, the length of the tube 36 can be altered by providing a cylindrical sleeve 38 around the lower end of the tube 36 in telescoping relation therewith. In this particular embodiment, a stud screw 39 extends radially outwardly from the wall of the tube 36 and is received in a vertically oriented and elongated slot 41 in the sleeve 38. An appropriate wing nut 42 is threadedly engaged with the stud screw 39 and upon a tightening thereof clamps the sleeve 38 between the wing nut 31 and the peripheral surface of the tube 36 to hold the sleeve 38 in its appropriate adjusted position. When the sleeve 38 is moved to its lowermost position relative to the tube 36, the vertical height of the deceleration cylinder will be at a maximum. The significance of this adjustment will be described in more detail below.

Figure 2:
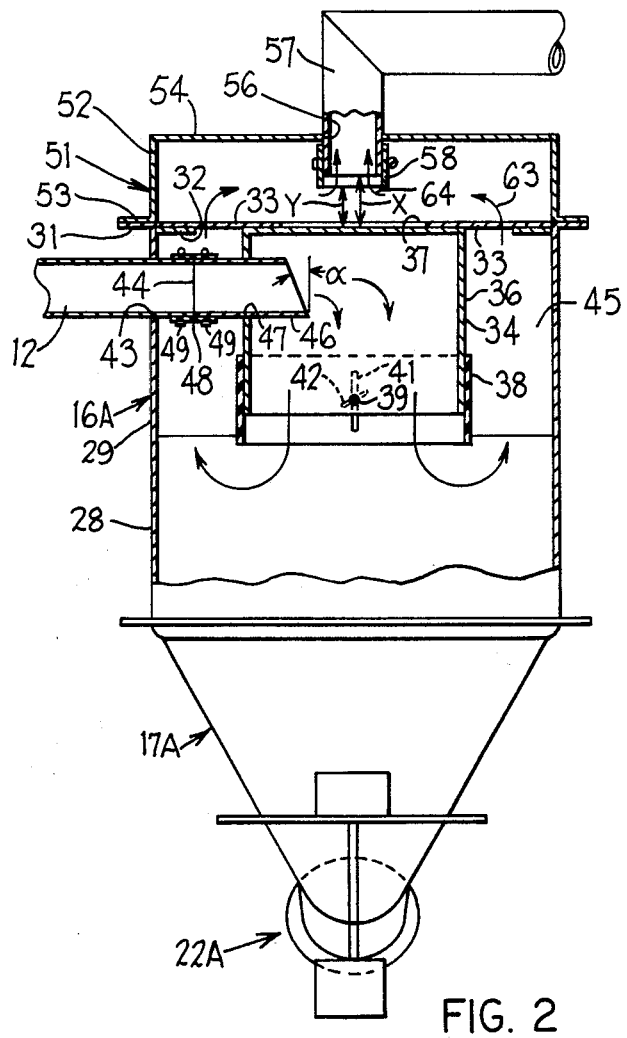
FIG 2. is an enlarged central sectional view through the vacuum receiver embodying the invention.

The conduit 12 described in relation to FIG. 1 is also shown in FIG. 2. The conduit 12 enters through an opening 43 in the wall of the tube 29 and terminates as at 44 intermediate the inside surface of the tube 29 and the outer surface of the tube 36, namely in the annular passage 45 defined thereby. A further conduit 46 is mounted in an opening 47 in the tube 36 and is coaxially aligned with the conduit 12. Further, the portion of the conduit 46 extending in the annular passage 45 between the outer surface of the tube 36 and the inner surface of the tube 29 abuts against the end of the conduit 12 as at 44. An appropriate sleeve 48 is placed in telescoping relation to the mutually adjacent ends of the conduit 12 and the conduit 46 and appropriate clamps 49 provided to secure the sleeve in place to prevent leakage between the mutually adjacent ends of the conduits 12 and 46. Further, it is to be understood that the connection between the tube 29 and the conduit 12 is sealed as is the connection between the conduit 46 and the tube 36. The innermost end of the conduit 46 is cut off at an angle to the vertical, the lowermost edge portion of the conduit 46 jutting further toward the center of the tube 36 than the upper edge portion thereof.

A hood or cap 51 is positioned over the top end of the tube 29 as illustrated in FIG. 2. The hood includes a cylindrical segment 52 equal in diameter to the diameter of the tube 29 and has a flange 53 radially outwardly extending therefrom at the lower edge which is coupled to the flange 31 by any conventional type of fastener, as by bolts (not illustrated). The hood 51 also has a top wall 54 with a central opening 56 therethrough. A conduit 57 is received in the central opening 56 and is sealingly secured thereto. The conduit 57 is oriented coaxially with the central axis of the tube 36 and the lowermost end thereof terminates a distance X above the top wall 37 of the deceleration cylinder 34. The conduit 57 extends to and is connected in circuit with the valve 21A illustrated in FIG. 1.

The distance X between the lower end of the conduit 57 and the top wall 37 of the deceleration cylinder 34 can be altered by means of a sleeve 58 encircling the lower end of the conduit 57 and held in position by a clamp 59. The clamp 59 includes a screw 61 which, when loosened, loosens the clamping effect of the clamp 59 to permit the sleeve 58 to be moved axially along the length of the conduit 57. As is shown in FIG.

4, the sleeve 58 has effectively altered the spacing between the lower end of the conduit 57 to the distance Y which is less than the distance X.

It is to be understood that the vacuum receiver embodying the invention can be adapted to fit on any size hopper in the field, provided an appropriate adapter is utilized between the cylindrical segment 28 and the tube 29.

OPERATION

Although the operation of the invention will be apparent to those skilled in the art, a brief discussion of the operation will be set forth hereinbelow for convenience purposes only.

Referring first to FIG. 1, the exhaust blower 18 is activated to draw a fluid (air) into the conduit 19. If each of the valves 21A, 21B and 21C is open, each of the vacuum receivers 16A, 16B and 16C will have fluid drawn into the space between the inside surface of the tube 29 and hood 51 and the outside surface of the deceleration cylinder 34, namely in the annular passage 45. Fluid will also be drawn into the deceleration cylinder 34 through the conduits 12 and 46. The fluid will travel downwardly of the deceleration cylinder 34 in direction of the illustrated arrows out of the deceleration cylinder through the opening at the bottom thereof and upwardly through the annular passage 45. Since the end of the conduit 12 remote from the vacuum receiver 16A is received into a material source 11, such as a conventional gaylord, particulate material therein will be drawn into the conduit 12 and entrained in the fluid media entering the deceleration cylinder 34. The kinetic energy of the particulate material will be sufficient upon entering the deceleration chamber to bounce off the inside wall surface of the tube 36 and promptly be decelerated and fall downwardly out of the deceleration cylinder and into the hopper 17A. Those particles that are entrained in the fluid will flow up through the annular passage 45 and will further decelerate during this upward travel and eventually fall back down into the hopper 17A. The dramatic right angle turn as at 63 and a further opposite right angle turn as at 64 all adjacent the upper portion of the deceleration cylinder 34 will further cause the particulate material entrained in the fluid to become disassociated with the fluid flow and fall back down into the hopper 17A.

If it is desired to run a different material through one of the extruders, such as the extruder 23A, the conduit 12 is removed from the previously mentioned material source 11 and placed into a different material source. If the material is more powdery than the first-mentioned particulate material, an appropriate adjustment of the sleeve 58 will be necessary and possibly a further adjustment of the sleeve 38 relative to the tube 36. A movement of the sleeve 58 downwardly from the terminal end of the conduit 57 will reduce the spacing between the bottom edge of the sleeve 58 and the top wall 37 of the deceleration cylinder 34 so that the fluid velocity in the annular passage 45 is appropriately controlled to enable the powdery material entrained in the fluid therein to appropriately decelerate and fall back down into the hopper 17A. An extension of the sleeve 38 downwardly from the tube 36 will cause the powdery material to travel a longer distance in the annular passage to enable the particulate material to further decelerate and fall back down into the hopper 17A.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a fluid conveying system having a vacuum receiver means adapted for use with a first conduit means and with a means for feeding particulate material into a fluid stream in said first conduit means and with a means for effecting a movement of said fluid stream with said particulate material therein through said first conduit means, said fluid conveying system including a collecting means for collecting particulate material removed from said fluid stream, said vacuum receiver means comprising a first tube enlarged relative to said first conduit means and into which said first conduit means extends, the axis of said first tube being vertically oriented, a second tube surrounding said first tube and of sufficiently greater girth to form an annular passage between said tubes, the length of said passage extending at least the full vertical length of said second tube, said first tube having a top wall located above the location whereat said first conduit means extends into said first tube, and means defining an opening in said first tube beneath the location whereat said first conduit means extends into said first tube and leading to said passage downstream of said location whereat said first conduit means extends into said first tube, second conduit means coaxial with said first tube and being of a smaller diameter than said first tube and terminating above said top wall, said second conduit means communicating with said second tube leading said stream from said passage at a location directly above said top wall and causing the direction of axial travel of said stream in said passage to be changed through two opposite 90° turns, said particulate material being sufficiently decelerated in said first and second tubes to become disassociated with said fluid stream, said vacuum receiver means being mounted on said collecting means, said first and second tubes being open to said collecting means to enable said collecting means to collect the material disassociated with said fluid stream, and adjustment means for varying the effective vertical spacing between the terminal end of said second conduit means and said top wall to thereby enable a varying of the velocity of said fluid stream in said passage to accommodate a specified material without causing said material to exit said second tube via said second conduit means.

2. The fluid conveying system according to claim 1, wherein said adjustment means includes a sleeve which encircles an end of said second conduit means and being axially movable relative to said second conduit means, the lowermost end of said sleeve being, therefore, variably spaced from said top wall of said first tube, and means for fixing the location of said sleeve on said second conduit means.

3. The fluid conveying system according to claim 1, wherein said second tube includes means for altering the effective vertical length of said passage.

4. The fluid conveying system according to claim 3, wherein said means for altering the effective vertical length of said passage includes an additional sleeve encircling the lowermost end of the first tube and means for fixedly securing said additional sleeve to said first tube.

5. The fluid conveying system according to claim 1, wherein the axes of said first conduit means, at said location whereat said first conduit means enters said first tube, is on a radius of said first tube.

6. The fluid conveying system according to claim 5, wherein said first and second tubes are concentric.

* * * * *